United States Patent
Yang

(10) Patent No.: US 12,263,817 B2
(45) Date of Patent: Apr. 1, 2025

(54) COOLING SYSTEM FOR A SENSOR CLEANING SYSTEM

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 245 days.

(21) Appl. No.: 17/987,474

(22) Filed: Nov. 15, 2022

(65) Prior Publication Data

US 2023/0166695 A1   Jun. 1, 2023

(30) Foreign Application Priority Data

Nov. 29, 2021   (KR) .................. 10-2021-0166409

(51) Int. Cl.
    *B60S 1/56*   (2006.01)
(52) U.S. Cl.
    CPC ..................... *B60S 1/56* (2013.01)

(58) Field of Classification Search
CPC .......... B60H 1/3233; B60R 16/08; B60S 1/56
USPC ............................................. 15/313
See application file for complete search history.

(56) References Cited

U.S. PATENT DOCUMENTS

| | | | |
|---|---|---|---|
| 10,012,133 B1 * | 7/2018 | Martin | ............. F01P 11/0204 |
| 11,273,798 B2 | 3/2022 | Giraud | |
| 2019/0106086 A1 | 4/2019 | Giraud | |
| 2019/0291666 A1 * | 9/2019 | Martin | ............... B60H 1/3233 |

FOREIGN PATENT DOCUMENTS

| | | | |
|---|---|---|---|
| JP | 2020032922 A | * | 3/2020 |
| KR | 20180136981 A | | 12/2018 |

* cited by examiner

*Primary Examiner* — Katina N. Henson
(74) *Attorney, Agent, or Firm* — Lempia Summerfield Katz LLC

(57) ABSTRACT

A cooling system is for cooling a sensor cleaning system of a vehicle. the cooling system includes a collector configured to accommodate water, which reaches a windshield of the vehicle, a pump providing a flow force for moving the water accommodated in the collector along a conduit, and a cooling module to which water moving along the conduit flows and which surrounds a cooling target.

12 Claims, 7 Drawing Sheets

COOLING SYSTEM FOR A SENSOR CLEANING SYSTEM

CROSS REFERENCE TO RELATED APPLICATION

The present application claims priority to Korean Patent Application No. 10-2021-0166409, filed Nov. 29, 2021, the entire contents of which are incorporated herein for all purposes by this reference.

BACKGROUND OF THE DISCLOSURE

Technical Field

The present disclosure relates to a cooling system. More particularly, the present disclosure relates to a cooling system for cooling a sensor cleaning system of a vehicle.

Description of the Related Art

Recently, vehicles are equipped with a driver assistance system that assists a driver of the vehicle to secure or ensure safe operation of the vehicle in various driving situations. In addition to the driver assistance system, research and development are being actively conducted on autonomous vehicles in which the vehicle may drive itself without driver intervention.

In such a driver assistance system or autonomous vehicle, various types of environmental sensors are installed on the vehicle that may detect the surrounding environment of the vehicle in various ways. Examples of the environmental sensors installed on such vehicles may include a radar, a lidar, a camera, or the like.

Since these sensors are mounted on the outside of the vehicle, a sensing area or a sensing surface of the sensor may become dirty or contaminated by foreign substances, such as dust, rain, or snow. Since the cleanliness of these sensors should be kept at a certain level to maintain the performance of the sensor, the vehicle is equipped with a sensor cleaning system that may clean the sensor when the sensing area is contaminated.

SUMMARY OF THE DISCLOSURE

Accordingly, the present disclosure has been made keeping in mind the above problems occurring in the related art. An objective of the present disclosure is to provide a cooling system for cooling a sensor cleaning system in a situation where sensor cleaning is frequently required, such as in the event of rain.

The present disclosure is not limited to the above-mentioned objective. Other objectives of the present disclosure may be evidently understood from the following description and may be realized by the means described in the claims and combinations thereof.

In order to achieve the objectives of the present disclosure, the present disclosure provides a cooling system for cooling a sensor cleaning system of a vehicle. The cooling system includes: a collector configured to accommodate water which reaches a windshield of the vehicle; a pump providing a flow force for moving the water accommodated in the collector along a conduit; and a cooling module to which water moving along the conduit flows and which surrounds a cooling target.

According to the present disclosure, a cooling system can cool a sensor cleaning system, and in particular, a compressor of the sensor cleaning system, in an environmentally friendly manner and in a situation where sensor cleaning is frequently required, such as in the event of rain.

The effects of the present disclosure are not limited to those described above. Other effects should be clearly recognized by those of ordinary skill in the art from the following description.

BRIEF DESCRIPTION OF THE DRAWINGS

The above and other objectives, features, and advantages of the present disclosure should be more clearly understood from the following detailed description when taken conjointly with the accompanying drawings, in which.

DETAILED DESCRIPTION OF THE DISCLOSURE

Figure 1:
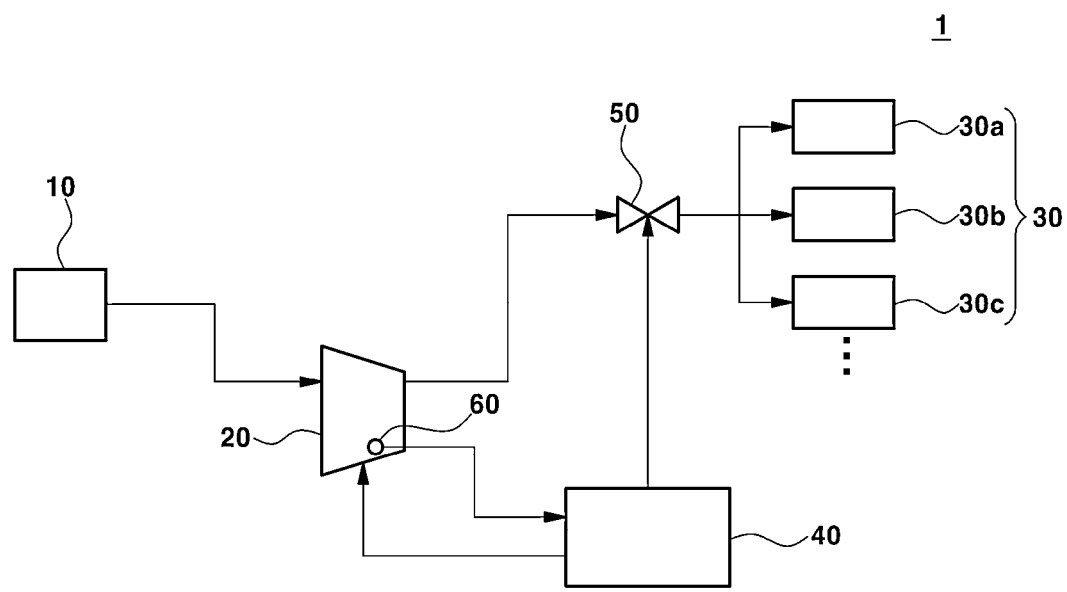
FIG. 1 is a diagram illustrating a configuration of a sensor cleaning system.

Specific structural or functional descriptions set forth in the embodiments of the present disclosure are only for description of the embodiments of the present disclosure Embodiments according to the concept of the present disclosure may be embodied in many different forms. The present disclosure should not be construed as being limited to only the embodiments set forth herein, but should be construed as covering modifications, equivalents, or alternatives falling within the idea and technical scope of the present disclosure.

It should be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to" should be construed in the same way.

Like reference numerals refer to like parts throughout various figures and embodiments of the present disclosure. The terminology used herein is only for the purpose of describing particular embodiments and is not intended to be limiting. In the present disclosure, singular forms are intended to include the plural forms as well, unless the context clearly indicates otherwise. It should be further understood that the terms "comprise," "include," "have," etc. when used in this specification, specify the presence of stated features, integers, steps, operations, elements, components, and/or combinations of them but do not preclude the presence or addition of one or more other features, integers, steps, operations, elements, components, and/or combinations thereof. When a component, device, element, or the like of the present disclosure is described as having a purpose or performing an operation, function, or the like, the component, device, or element should be considered herein as being "configured to" meet that purpose or perform that operation or function.

Hereinafter, the present disclosure is described in detail with reference to the accompanying drawings.

As described above, in order to maintain the performance of environmental sensors that sense the surrounding environment of the vehicle, the periodic cleaning of a sensor surface is required. For example, the environmental sensors may be contaminated by foreign substances, such as dust and sand, and may be contaminated by raindrops or snow during precipitation.

FIG. 1 illustrates an air cleaning system 1, which cleans an environment sensor using compressed air. The air cleaning system 1 performs a cleaning operation by spraying the compressed air onto a surface of the environment sensor. To be more specific, air filtered through an air filter 10, which is provided in a vehicle, is introduced into a compressor 20. As air compressed by the compressor 20 is sprayed onto the surface of the environment sensor 30, each environment sensor 30a, 30b, 30c is cleaned. Although three environment sensors are proposed in the drawings and the specification, the number of the sensors may be changed without being limited thereto.

A controller 40 of the air cleaning system 1 turns on a valve 50, for example, a solenoid valve, during a preset period or in a preset situation, such as when the environment sensor 30 detects contamination. Thus, compressed air is sprayed from the compressor 20 onto each environment sensor 30a, 30b, 30c to thereby clean the environment sensor 30.

The compressor 20 is provided with a temperature sensor 60. The temperature of the compressor 20 detected by the temperature sensor 60 is transmitted to the controller 40 of the air cleaning system 1. The controller 40 is configured to monitor the temperature of the compressor 20 so that the compressor 20 is not operated above an operating limit temperature. If the compressor 20 reaches the operating limit temperature, the controller 40 may stop operating the compressor 20 until the temperature of the compressor 20 drops.

The air cleaning system 1 may be configured to be executed or operated based on conditions, such as the contamination degree of a sensor surface or a preset period. For example, when the sensor cleaning system 1 is configured to operate according to the contamination degree of the sensor surface, the compressor 20 should be continuously operated to generate compressed air for cleaning if the sensor surface is contaminated by precipitation or the like. In this case, the prolonged driving of the compressor 20 causes the temperature of the compressor to rise. The compressor may reach the operating limit temperature, causing the compressor to stop operating for a predetermined period while cooling down.

Therefore, it is very important to reduce the temperature of the compressor in the air cleaning system.

Accordingly, the present disclosure provides a cooling system, which cools the compressor 20 using precipitation, thus achieving effective compressor cooling. The cooling system for the sensor cleaning system according to the present disclosure includes a precipitation supply part and a cooling module. The precipitation supply part is configured to collect precipitation, such as rain or snow, falling on the vehicle and then deliver the precipitation to the compressor. As is described in detail below, the precipitation supply part may include a collector 140, a conduit 150, a pump 160, and a rotating body 170. The cooling module is configured to reduce the temperature of the compressor using the precipitation supplied from the precipitation supply part.

The cooling system according to an embodiment of the present disclosure is described with reference to FIGS. 2-9B.

Figure 2:
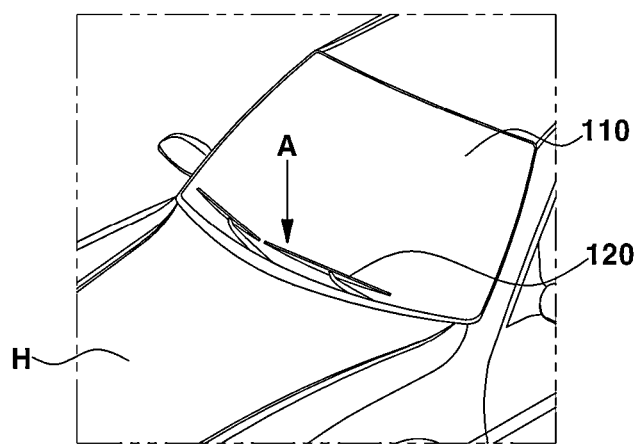
FIG. 2 is a diagram illustrating a periphery of a windshield of a vehicle.

As shown in FIG. 2, precipitation, such as rainwater, falls on the hood H and windshield 110 of the vehicle, which is driving. A wiper 120 is operated by a driver of the vehicle or is automatically operated through the detection of a rain sensor of the vehicle so as to maintain or secure a relatively clear front visual field. At this time, at least a portion of rainwater from the windshield 110 or rainwater removed by the wiper 120 flows to a cowl top cover 130. The precipitation may include rain, sleet, snow, etc. but the term "rainwater" is used generally below for water collected during precipitation.

Figure 3:
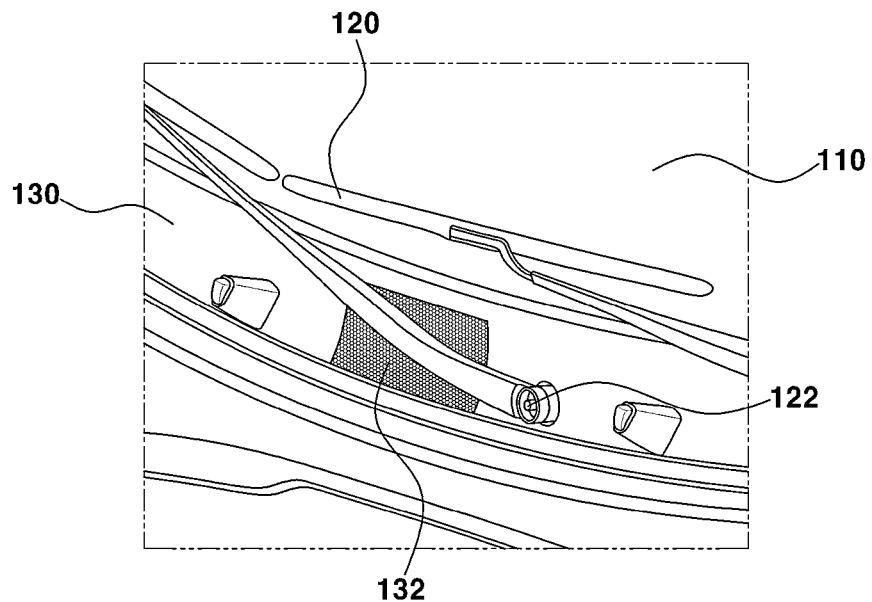
FIG. 3 is an enlarged view of a portion of the windshield and vehicle seen from side A of FIG. 2.
Figure 4:
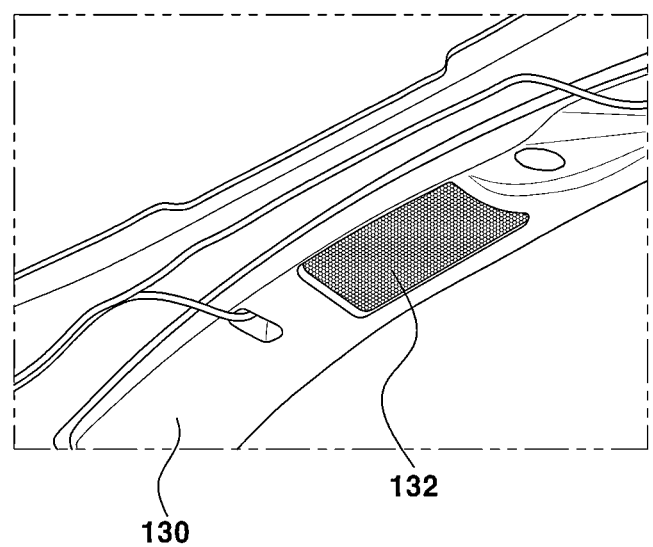
FIG. 4 is a bottom view of the portion of FIG. 3.

As shown in FIGS. 3 and 4, the cowl top cover 130 is provided with a passage 132. The passage 132 is configured to cause upper and lower portions of the cowl top cover 130 to communicate with each other. As non-limiting examples, the passage 132 may be configured in the shape of comb teeth or in a honeycomb pattern with apertures therethrough. As another non-limiting example, the passage 132 may be configured in the shape of a lattice or grid structure with apertures therethrough. In addition to these examples, the passage 132 may have any shape as long as it may cause the upper and lower portions of the cowl top cover 130 to fluidly communicate with each other and may filter or prevent impurities other than rainwater from passing through the passage 132.

Figure 5:
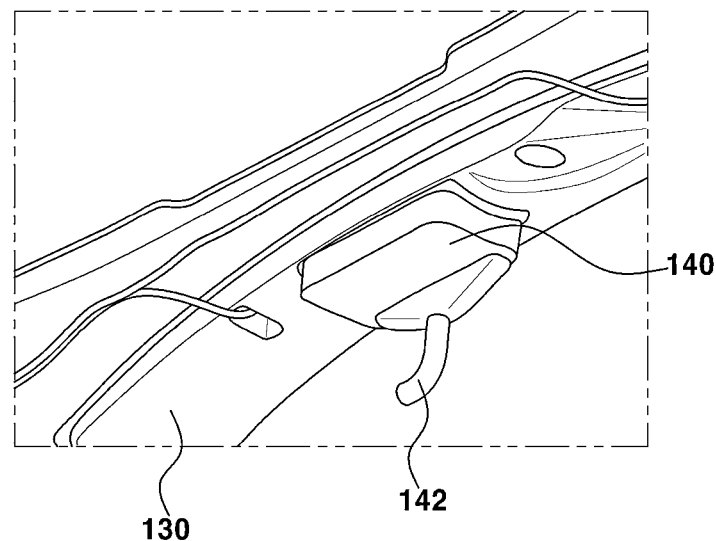
FIG. 5 is a bottom view of the portion of FIG. 3 and illustrating a state in which a collector of a cooling system according to the present disclosure is mounted.

Referring to FIG. 5, the collector 140 is provided under the passage 132. The collector 140 serves to collect rainwater that passes through the passage 132. The collector 140 includes a concave portion and rainwater passing through the passage 132 is collected in the concave portion. A discharge port 142 is provided on a side of the collector 140, such as the bottom side. The discharge port 142 discharges rainwater collected in the collector 140 to the outside of the collector 140.

Figure 6:
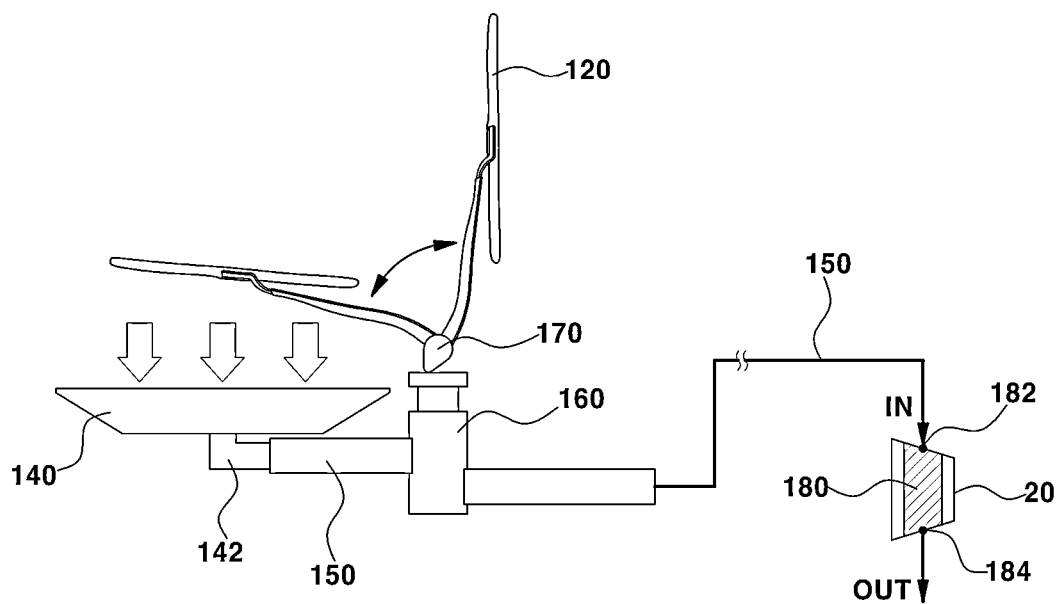
FIG. 6 is a diagram illustrating a schematic configuration of a cooling system according to an embodiment of the present disclosure.

Referring to FIG. 6, a conduit 150 is connected to the discharge port 142 to direct rainwater from the collector 140 to the compressor 20. The conduit 150 may extend from the collector 140 to the compressor 20.

The pump 160 is connected to the conduit 150. The pump 160 serves to transport, move, deliver, or pump water from the collector 140. To be more specific, water in the collector 140 may be moved through the conduit 150 to the compressor 20 by the operation of the pump 160. According to an embodiment of the present disclosure, the pump 160 is operated when the wiper 120 is driven.

Figure 7A:
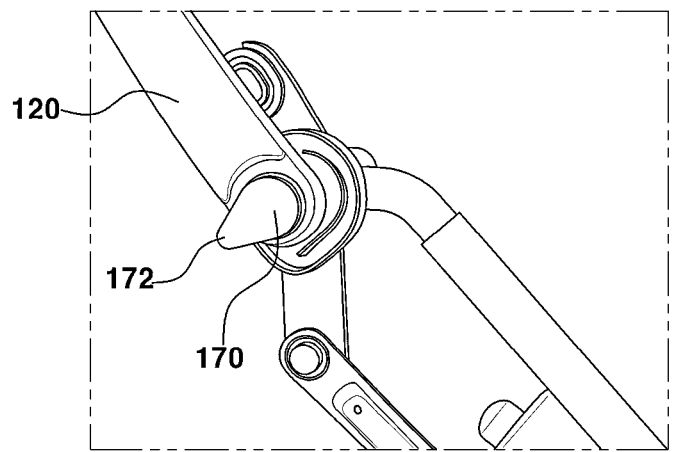
FIG. 7A illustrates a rotating body, which drives the cooling system according to an embodiment of the present disclosure.
Figure 7B:
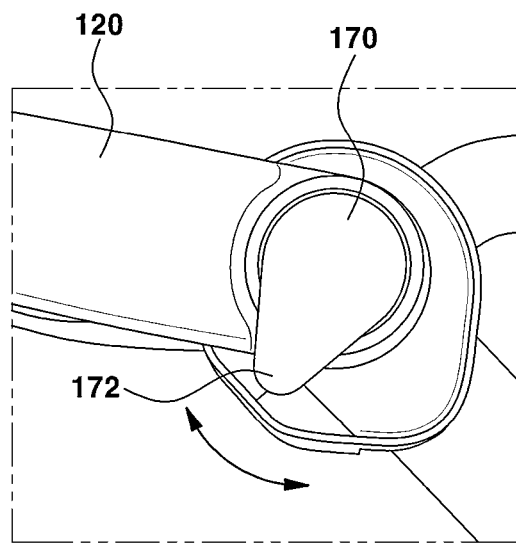
FIG. 7B is a partially enlarged view of the rotating body of FIG. 7A.
Figure 7C:
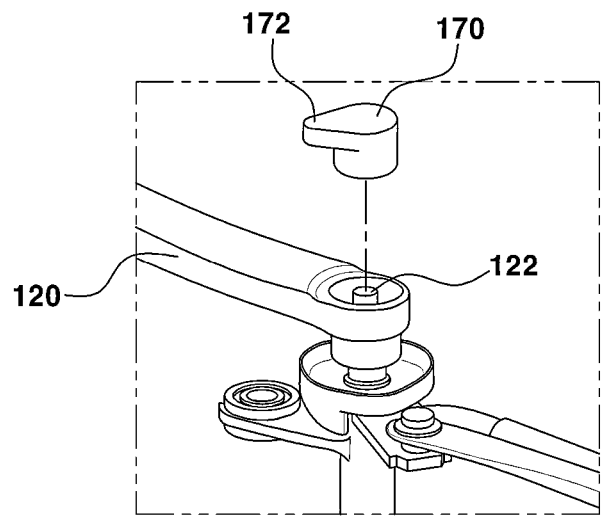
FIG. 7C is a partially exploded perspective view of the rotating body of FIG. 7A.

As shown in FIGS. 7A-7C, the rotating body 170 is provided on a pivot point of the wiper 120 or a driving shaft 122. The rotating body 170 is mounted on the driving shaft 122 to rotate together with the wiper 120 when the wiper moves. According to an embodiment of the present disclosure, the rotating body 170 includes a protrusion 172. In an embodiment, the protrusion 172 protrudes to the outside of the rotating body 170. Further, the protrusion 172 may take a shape, such as a conical or frustoconical shape, in which a width thereof gradually decreases towards the outside or one end. According to the present disclosure, since the rotating body 170 is coupled to the driving shaft 122 of the wiper 120, it is possible to minimize the influence of the rotating body on the durability of the wiper 120 during operation.

Figure 8A:
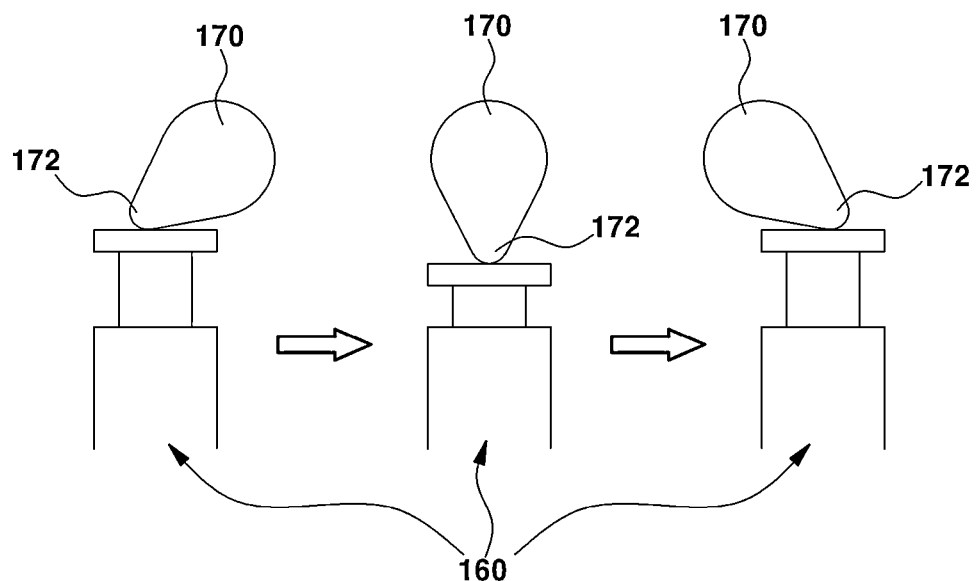
FIG. 8A illustrates an operating mechanism of the rotating body of the cooling system according to an embodiment of the present disclosure.
Figure 8B:
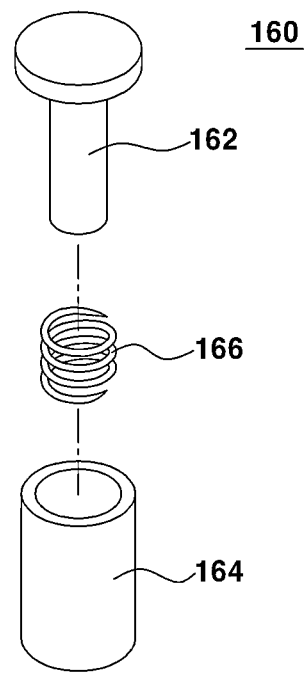
FIG. 8B is an exploded perspective view of a pump of the cooling system according to an embodiment of the present disclosure.

Referring to FIGS. 8A and 8B, the protrusion 172 serves to operate the pump 160. The pump 160 is disposed on the conduit 150 to contact the rotating body 170. Particularly, the protrusion 172 of the rotating body 170 is disposed on the conduit 150 to contact the pump 160. According to an embodiment of the present disclosure, the pump 160 is a piston pump, and the pump 160 includes a piston 162, a cylinder 164, and a spring 166.

The piston 162 may move up and down in the cylinder 164. Rainwater is introduced into the cylinder 164 in the upward stroke of the piston 162, and rainwater is discharged to the outside of the cylinder 164 in the downward stroke of the piston 162. Thus, rainwater from the discharge port 142 flows towards the compressor 20.

The spring 166 is accommodated in the cylinder 164. When the piston 162 moves downwards in the cylinder 164, the spring 166 is compressed. When the piston 162 moves upwards, the spring 166 is restored to its original position.

Figure 9A:
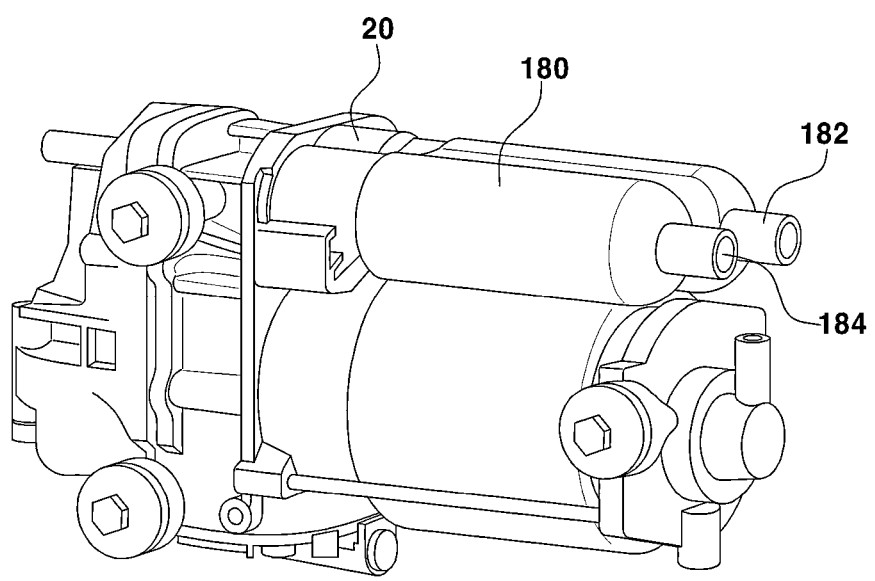
FIGS. 9A and 9B illustrate a cooling module disposed to surround a compressor in the form of a sleeve according to an embodiment of the present disclosure.
Figure 9B:
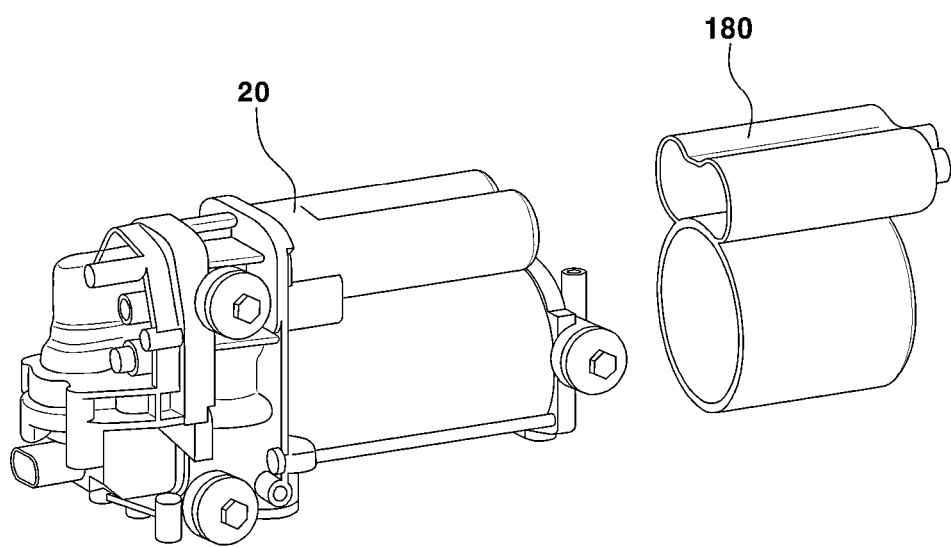

Rainwater passing through the pump 160 flows along the conduit 150 towards the compressor 20. To be more specific, rainwater is directed to the cooling module 180 surrounding the compressor 20. Referring to FIGS. 9A and 9B, in an embodiment, the cooling module 180 may be disposed to surround the compressor 20 in the form of a sleeve.

Rainwater is introduced into the cooling module 180. The cooling module 180 is provided with an inlet 182 for receiving rainwater and an outlet 184 for discharging rainwater from the cooling module 180. The compressor 20 may be cooled by rainwater, which is introduced through the inlet 182 into the cooling module 180. Further, the rainwater discharged through the outlet 184 after cooling the compressor 20 is discharged to the ground. As the rainwater is used as cooling water for cooling the compressor 20, the rainwater, which has been used for the cooling operation, may be discharged to the outside of the vehicle without any problem.

Turning back to FIG. 8A, the interlocking operation of the rotating body 170 and the pump 160 are described below.

The protrusion 172 of the rotating body 170 may be in contact with the piston 162 of the pump 160. However, while the wiper 120 is not operating, the protrusion 172 may be in contact with the piston without pressing the piston 162 or may be spaced apart from the piston 162 by a predetermined distance. However, when the piston 162 of the pump 160 and the rotating body 170 are in contact with each other without being separated from each other in any state, impact of the protrusion 172 on the piston 160 caused by the driving of the wiper 120 may be reduced, thus minimizing a reduction in durability of or reducing damage done to the wiper 120.

When the wiper 120 is operated at or from a stop position at a lower portion of the windshield 110 to move along the windshield 110, the rotating body 170 also rotates and the protrusion 172 of the rotating body 170 presses the piston 162 of the pump 160. In contrast, when the wiper 120 rotates and returns to the stop position, the rotating body 170 also rotates and the protrusion 172 releases pressure from the piston 162. In an embodiment, the rotating body 170 is configured to move between the two positions shown on the left in FIG. 8A when the wiper 120 moves from the stop position to the highest position, thus operating the pump 160 (rotated approximately 90°). In another embodiment, the piston 162 is pressed (the middle state of FIG. 8A) between the stop position and the highest position of the wiper 120. Then, when the highest position is reached, pressure is released from the piston 162 (the right state of FIG. 8A) so that the rotating body is moved between the three positions of FIG. 8A (rotated approximately 180°). The protrusion 172 may press the piston 162 or release pressure from the piston 162 by changing a portion of the protrusion 172 contacting the piston 162 or an area of the protrusion 172 contacting the piston 162 while rotating.

The pumping speed of the pump 160 may vary depending on the driving speed of the wiper 120. In other words, as the driving speed of the wiper 120 increases, the pump 160 is more frequently pressed by the rotating body 170, so the pumping speed is increased. When it rains heavily, rainwater falling on the windshield 110 makes it more difficult to maintain or secure a relatively clear visual field, so the wiper 120 is operated more rapidly or frequently.

Likewise, when it rains hard, the sensor should be more frequently cleaned, and the compressor 20 is continuously driven to clean the sensor. According to the present disclosure, through the pump 160, which is operated in association with the driving speed of the wiper 120, it is possible to cope more effectively with a temperature rise due to the continuous driving of the compressor 20. In other words, when it rains hard, the operating time of the compressor 20 is increased to remove rainwater from the sensor surface, which requires higher cooling performance for the compressor 20. Since a lot of precipitation leads to an increase in wiper operating speed, the operating speed of the pump 160 is increased, thus improving the cooling performance of the compressor 20.

The present disclosure utilizes rainwater collected by the wiper as cooling water and directs the cooling water towards the compressor using the kinetic energy of the wiper, thereby efficiently and effectively cooling the compressor without the necessity of installing a separate electric pump or a tank for cooling water.

The present disclosure can cool the compressor without additional power consumption using the driving force of the wiper.

The present disclosure is environment-friendly because rainwater is utilized as cooling water.

The present disclosure can increase the operating period of the compressor by lowering the temperature of the compressor, and consequently enable the sensor cleaning system to be continuously driven, so that the cleaning performance for the sensor of the vehicle is excellent.

Although the present disclosure has been described with reference to specific embodiments shown in the drawings, it should be apparent to those of ordinary skill in the art that the embodiments of the present disclosure may be changed and modified in various ways without departing from the scope of the present inventive concept, which is described in the following claims.

What is claimed is:

1. A cooling system for a sensor cleaning system of a vehicle, the cooling system comprising:
   a collector configured to accommodate water which reaches a windshield of the vehicle;
   a pump providing a flow force for moving the water accommodated in the collector along a conduit and configured to operate by driving a wiper rotatably mounted on the windshield by a driving shaft, wherein the pump comprises a piston configured to be directly pressed by the wiper;
   a cooling module to which water moving along the conduit flows and which surrounds a cooling target; and
   a rotating body mounted on the driving shaft, the rotating body being configured to press the piston by rotating the wiper, wherein the rotating body is configured to press the piston or release pressure from the piston by changing a portion or an area of the rotating body contacting the piston.

2. The cooling system of claim 1, further comprising:
   a windshield of a vehicle, wherein the collector is provided on a lower portion of a cowl top cover provided on a lower portion of the windshield.

3. The cooling system of claim 2, wherein a passage is provided in the cowl top cover to cause upper and lower portions of the cowl top cover to communicate with each other, and wherein the collector is mounted below the passage.

4. The cooling system of claim 3, wherein the passage has a shape of comb teeth or a shape of a lattice.

5. The cooling system of claim 1, further comprising:
   a windshield of a vehicle, wherein the water is collected in the collector by a wiper rotatably mounted on the windshield.

6. The cooling system of claim 1, wherein the pump comprises:
   a cylinder movably accommodating the piston; and
   a spring accommodated in the cylinder to provide a restoring force to the piston.

7. The cooling system of claim 1, wherein the rotating body is configured to contact the piston and to press the piston or release pressure from the piston by rotating the wiper.

8. The cooling system of claim 7, wherein the rotating body comprises a protrusion, which protrudes towards the piston and maintains contact with the piston.

9. The cooling system of claim 8, wherein the protrusion is configured to press the piston or release pressure from the piston by changing a portion or an area of the protrusion contacting the piston.

10. The cooling system of claim 1, wherein the cooling module comprises:
    an inlet connected to the conduit and configured to introduce the water to the cooling module; and
    an outlet configured to discharge water that flows in the cooling module.

11. The cooling system of claim 1, wherein the water is rainwater.

12. The cooling system of claim 1, wherein the cooling target is a compressor, which provides compressed air that is sprayed onto a sensor of the vehicle.

* * * * *